United States Patent
Zhou et al.

(10) Patent No.: US 11,310,202 B2
(45) Date of Patent: Apr. 19, 2022

(54) SHARING OF FIREWALL RULES AMONG MULTIPLE WORKLOADS IN A HYPERVISOR

(71) Applicant: VMware, Inc., Palo Alto, CA (US)

(72) Inventors: Jingmin Zhou, Los Gatos, CA (US); David Lorenzo, Redwood City, CA (US); Subrahmanyam Manuguri, San Jose, CA (US); Anirban Sengupta, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 487 days.

(21) Appl. No.: 16/352,577

(22) Filed: Mar. 13, 2019

(65) Prior Publication Data

US 2020/0296078 A1  Sep. 17, 2020

(51) Int. Cl.
*H04L 29/06* (2006.01)
*G06F 9/455* (2018.01)
*G06F 16/901* (2019.01)

(52) U.S. Cl.
CPC ...... *H04L 63/0263* (2013.01); *G06F 9/45558* (2013.01); *G06F 16/9024* (2019.01); *H04L 63/0218* (2013.01); *G06F 2009/45587* (2013.01)

(58) Field of Classification Search
CPC ............ H04L 63/0263; H04L 63/0218; G06F 9/45558; G06F 9/4553; G06F 16/9024; G06F 2009/45587
See application file for complete search history.

(56) References Cited

U.S. PATENT DOCUMENTS

| 5,581,722 A | 12/1996 | Welland |
| 5,968,176 A | 10/1999 | Nessett et al. |
| 6,154,775 A | 11/2000 | Coss et al. |
| 6,219,786 B1 | 4/2001 | Cunningham et al. |

(Continued)

FOREIGN PATENT DOCUMENTS

| EP | 2748750 A1 | 7/2014 |
| JP | 2003188906 A | 7/2003 |

(Continued)

OTHER PUBLICATIONS

Author Unknown, "CISCO Identity-Based Firewall Security," Month Unknown 2011, 2 pages, CISCO Systems, Inc.

(Continued)

*Primary Examiner* — Lynn D Feild
*Assistant Examiner* — Abdullah Almamun
(74) *Attorney, Agent, or Firm* — Adeli LLP

(57) ABSTRACT

In some embodiments, a method receives a packet at an instance of a distributed firewall associated with one of a plurality of workloads running on a hypervisor. Each of the plurality of workloads has an associated instance of the distributed firewall. An index table is accessed for the workload where the index table includes a set of references to a set of rules in a rules table. Each workload in the plurality of workloads is associated with an index table that references rules that are applicable to each respective workload. The method then accesses at least one rule in a set of rules associated with the set of references from the rules table and compares one or more attributes for the packet to information stored for the at least one rule in the set of rules to determine a rule in the set of rules to apply to the packet.

18 Claims, 4 Drawing Sheets

(56) References Cited

U.S. PATENT DOCUMENTS

| | | | |
|---|---|---|---|
| 6,496,935 B1 | 12/2002 | Fink et al. |
| 6,600,744 B1 | 7/2003 | Carr et al. |
| 6,708,187 B1 | 3/2004 | Shanumgam et al. |
| 6,880,089 B1 | 4/2005 | Bommareddy et al. |
| 7,032,022 B1 | 4/2006 | Shanumgam et al. |
| 7,055,173 B1 | 5/2006 | Chaganty et al. |
| 7,106,756 B1 | 9/2006 | Donovan et al. |
| 7,227,842 B1 | 6/2007 | Ji et al. |
| 7,349,382 B2 | 3/2008 | Marimuthu et al. |
| 7,657,887 B2 | 2/2010 | Kothandaraman et al. |
| 7,676,836 B2 | 3/2010 | Prigent et al. |
| 7,724,740 B1 | 5/2010 | Wang et al. |
| 7,818,452 B2 | 10/2010 | Matthews et al. |
| 7,831,826 B2 | 11/2010 | Koti et al. |
| 7,894,480 B1 | 2/2011 | Wang et al. |
| 7,948,986 B1 | 5/2011 | Ghosh et al. |
| 7,954,143 B2 | 5/2011 | Aaron |
| 8,032,933 B2 | 10/2011 | Turley et al. |
| 8,065,725 B2 | 11/2011 | Zheng et al. |
| 8,190,767 B1 | 5/2012 | Maufer et al. |
| 8,365,294 B2 | 1/2013 | Ross |
| 8,578,500 B2 | 11/2013 | Long |
| 8,621,552 B1 | 12/2013 | Lotem et al. |
| 8,660,129 B1 | 2/2014 | Brendel et al. |
| 8,813,209 B2 | 8/2014 | Bhattacharya et al. |
| 8,904,511 B1 | 12/2014 | O'Neill et al. |
| 9,015,823 B2 | 4/2015 | Koponen et al. |
| 9,047,109 B1 | 6/2015 | Wang et al. |
| 9,130,901 B2 | 9/2015 | Lee |
| 9,154,462 B2 | 10/2015 | Grimes et al. |
| 9,215,210 B2 | 12/2015 | Raman et al. |
| 9,215,213 B2 | 12/2015 | Bansal et al. |
| 9,215,214 B2 | 12/2015 | Bansal et al. |
| 9,276,904 B2 | 3/2016 | Bansal et al. |
| 9,367,257 B2 | 6/2016 | Hamilton et al. |
| 9,369,431 B1 | 6/2016 | Kirby et al. |
| 9,479,464 B1 | 10/2016 | Wang et al. |
| 9,553,806 B2 | 1/2017 | Anand |
| 9,614,748 B1 | 4/2017 | Battersby et al. |
| 9,621,516 B2 | 4/2017 | Basak et al. |
| 9,680,706 B2 | 6/2017 | Masurekar et al. |
| 9,755,903 B2 | 9/2017 | Masurekar et al. |
| 9,774,537 B2 | 9/2017 | Jain et al. |
| 9,774,707 B2 | 9/2017 | Parthasarathy et al. |
| 9,806,948 B2 | 10/2017 | Masurekar et al. |
| 9,860,279 B2 | 1/2018 | Jain et al. |
| 9,894,103 B2 | 2/2018 | Kwok et al. |
| 9,906,560 B2 | 2/2018 | Jain et al. |
| 9,906,561 B2 | 2/2018 | Jain et al. |
| 9,906,562 B2 | 2/2018 | Jain et al. |
| 10,135,727 B2 | 11/2018 | Gude et al. |
| 10,148,696 B2 | 12/2018 | Nimmagadda et al. |
| 10,264,021 B2 | 4/2019 | Bansal et al. |
| 10,348,685 B2 | 7/2019 | Chalvadi et al. |
| 10,944,722 B2 | 3/2021 | Popuri et al. |
| 11,005,815 B2 | 5/2021 | Chalvadi et al. |
| 2002/0078370 A1 | 6/2002 | Tahan |
| 2003/0041266 A1 | 2/2003 | Ke et al. |
| 2003/0093481 A1 | 5/2003 | Mitchell et al. |
| 2003/0120955 A1 | 6/2003 | Bartal et al. |
| 2003/0126468 A1 | 7/2003 | Markham |
| 2003/0226027 A1 | 12/2003 | Marquet et al. |
| 2004/0049701 A1 | 3/2004 | Pennec et al. |
| 2004/0177276 A1 | 9/2004 | MacKinnon et al. |
| 2004/0223495 A1 | 11/2004 | Paehl |
| 2004/0243835 A1 | 12/2004 | Terzis et al. |
| 2004/0255151 A1* | 12/2004 | Mei ................ H04L 63/105 726/25 |
| 2005/0078601 A1* | 4/2005 | Moll ................ H04L 45/00 370/218 |
| 2005/0190909 A1 | 9/2005 | Yoneyama et al. |
| 2005/0198125 A1 | 9/2005 | Beck et al. |
| 2005/0210291 A1 | 9/2005 | Miyawaki et al. |
| 2005/0276262 A1 | 12/2005 | Schuba et al. |
| 2005/0278431 A1 | 12/2005 | Goldschmidt et al. |
| 2006/0013136 A1 | 1/2006 | Goldschmidt et al. |
| 2006/0129808 A1 | 6/2006 | Koti et al. |
| 2006/0168213 A1 | 7/2006 | Richardson et al. |
| 2006/0195896 A1 | 8/2006 | Fulp et al. |
| 2007/0028291 A1 | 2/2007 | Brennan et al. |
| 2007/0061492 A1 | 3/2007 | Riel |
| 2007/0118893 A1 | 5/2007 | Crawford |
| 2007/0136813 A1 | 6/2007 | Wong |
| 2008/0072305 A1 | 3/2008 | Casado et al. |
| 2008/0082977 A1 | 4/2008 | Araujo et al. |
| 2008/0115190 A1 | 5/2008 | Aaron |
| 2008/0148382 A1 | 6/2008 | Bartholomy et al. |
| 2008/0189769 A1 | 8/2008 | Casado et al. |
| 2008/0215518 A1 | 9/2008 | Matsuda |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007219 A1 | 1/2009 | Abzarian et al. |
| 2009/0007251 A1 | 1/2009 | Abzarian et al. |
| 2009/0083727 A1 | 3/2009 | Fu et al. |
| 2009/0129271 A1 | 5/2009 | Ramankutty et al. |
| 2009/0150521 A1 | 6/2009 | Tripathi |
| 2009/0185568 A1* | 7/2009 | Cho ................ H04L 63/0236 370/395.31 |
| 2009/0228972 A1 | 9/2009 | Bandi et al. |
| 2009/0235325 A1 | 9/2009 | Dimitrakos et al. |
| 2009/0249436 A1 | 10/2009 | Coles et al. |
| 2009/0249438 A1 | 10/2009 | Litvin et al. |
| 2009/0249470 A1 | 10/2009 | Litvin et al. |
| 2009/0249472 A1 | 10/2009 | Litvin et al. |
| 2009/0276771 A1 | 11/2009 | Nickolov et al. |
| 2009/0327198 A1 | 12/2009 | Farah |
| 2009/0327781 A1 | 12/2009 | Tripathi |
| 2010/0037310 A1 | 2/2010 | Turley et al. |
| 2010/0037311 A1 | 2/2010 | He et al. |
| 2010/0037331 A1 | 2/2010 | Blake et al. |
| 2010/0043067 A1 | 2/2010 | Varadhan et al. |
| 2010/0100616 A1 | 4/2010 | Bryson et al. |
| 2010/0100949 A1 | 4/2010 | Sonwane et al. |
| 2010/0125667 A1 | 5/2010 | Soundararajan |
| 2010/0180331 A1 | 7/2010 | Murakami et al. |
| 2010/0192215 A1 | 7/2010 | Yaxuan et al. |
| 2010/0333165 A1 | 12/2010 | Basak et al. |
| 2011/0016467 A1 | 1/2011 | Kane |
| 2011/0022695 A1 | 1/2011 | Dalal et al. |
| 2011/0055916 A1 | 3/2011 | Ahn |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0154470 A1 | 6/2011 | Grimes et al. |
| 2011/0213875 A1 | 9/2011 | Ferris et al. |
| 2011/0246637 A1 | 10/2011 | Murakami |
| 2011/0302647 A1 | 12/2011 | Bhattacharya et al. |
| 2012/0042033 A1 | 2/2012 | Ayala, Jr. et al. |
| 2012/0137199 A1 | 5/2012 | Liu |
| 2012/0180104 A1 | 7/2012 | Gronich et al. |
| 2012/0240182 A1 | 9/2012 | Narayanaswamy et al. |
| 2012/0263049 A1 | 10/2012 | Venkatachalapathy et al. |
| 2012/0291024 A1 | 11/2012 | Barabash et al. |
| 2012/0314617 A1 | 12/2012 | Erichsen et al. |
| 2013/0007740 A1 | 1/2013 | Kikuchi et al. |
| 2013/0019277 A1 | 1/2013 | Chang et al. |
| 2013/0031544 A1 | 1/2013 | Sridharan et al. |
| 2013/0047151 A1 | 2/2013 | Sridharan et al. |
| 2013/0073743 A1 | 3/2013 | Ramasamy et al. |
| 2013/0074066 A1 | 3/2013 | Sanzgiri et al. |
| 2013/0125230 A1 | 5/2013 | Koponen et al. |
| 2013/0163594 A1 | 6/2013 | Sharma et al. |
| 2013/0198355 A1 | 8/2013 | Kalyanaraman et al. |
| 2013/0219384 A1 | 8/2013 | Srinivasan et al. |
| 2013/0227097 A1 | 8/2013 | Yasuda et al. |
| 2013/0227550 A1 | 8/2013 | Weinstein et al. |
| 2013/0311358 A1 | 11/2013 | Sethi et al. |
| 2013/0311612 A1 | 11/2013 | Dickinson |
| 2013/0332983 A1 | 12/2013 | Koorevaar et al. |
| 2014/0068602 A1 | 3/2014 | Gember et al. |
| 2014/0108319 A1 | 4/2014 | Klauser et al. |
| 2014/0115578 A1 | 4/2014 | Cooper et al. |
| 2014/0149794 A1 | 5/2014 | Shetty et al. |

(56) References Cited

U.S. PATENT DOCUMENTS

| | | |
|---|---|---|
| 2014/0195666 A1 | 7/2014 | Dumitriu et al. |
| 2014/0245423 A1 | 8/2014 | Lee |
| 2014/0281030 A1 | 9/2014 | Cui et al. |
| 2014/0282855 A1 | 9/2014 | Clark et al. |
| 2014/0282889 A1 | 9/2014 | Ishaya et al. |
| 2014/0297780 A1 | 10/2014 | Zhou et al. |
| 2014/0304387 A1 | 10/2014 | Bansal et al. |
| 2014/0325037 A1 | 10/2014 | Elisha |
| 2015/0052521 A1 | 2/2015 | Raghu |
| 2015/0112933 A1 | 4/2015 | Satapathy |
| 2015/0163200 A1 | 6/2015 | Chang et al. |
| 2015/0193466 A1 | 7/2015 | Luft |
| 2015/0200816 A1 | 7/2015 | Yung et al. |
| 2015/0229641 A1 | 8/2015 | Sun et al. |
| 2015/0237013 A1 | 8/2015 | Bansal et al. |
| 2015/0237014 A1 | 8/2015 | Bansal et al. |
| 2015/0237015 A1 | 8/2015 | Bansal et al. |
| 2015/0277949 A1 | 10/2015 | Loh et al. |
| 2016/0050117 A1 | 2/2016 | Voellmy et al. |
| 2016/0050141 A1 | 2/2016 | Wu et al. |
| 2016/0065627 A1* | 3/2016 | Pearl ................ G06F 16/14 709/204 |
| 2016/0094456 A1 | 3/2016 | Jain et al. |
| 2016/0094643 A1 | 3/2016 | Jain et al. |
| 2016/0105333 A1 | 4/2016 | Lenglet et al. |
| 2016/0112374 A1 | 4/2016 | Branca |
| 2016/0149863 A1 | 5/2016 | Walker et al. |
| 2016/0156591 A1 | 6/2016 | Zhou et al. |
| 2016/0182454 A1 | 6/2016 | Phonsa et al. |
| 2016/0191466 A1 | 6/2016 | Pernicha |
| 2016/0191570 A1 | 6/2016 | Bansal et al. |
| 2016/0241702 A1 | 8/2016 | Chandra et al. |
| 2017/0004192 A1 | 1/2017 | Masurekar et al. |
| 2017/0005867 A1 | 1/2017 | Masurekar et al. |
| 2017/0005987 A1 | 1/2017 | Masurekar et al. |
| 2017/0005988 A1 | 1/2017 | Bansal et al. |
| 2017/0026283 A1 | 1/2017 | Williams et al. |
| 2017/0064749 A1 | 3/2017 | Jain et al. |
| 2017/0104720 A1 | 4/2017 | Bansal et al. |
| 2017/0118173 A1* | 4/2017 | Arramreddy ........... H04L 63/20 |
| 2017/0134422 A1 | 5/2017 | Shieh et al. |
| 2017/0134436 A1 | 5/2017 | Agarwal et al. |
| 2017/0171362 A1* | 6/2017 | Bolotov ............. H04L 63/0263 |
| 2017/0180319 A1 | 6/2017 | Nimmagadda et al. |
| 2017/0180320 A1 | 6/2017 | Nimmagadda et al. |
| 2017/0180321 A1 | 6/2017 | Nimmagadda et al. |
| 2017/0180423 A1 | 6/2017 | Nimmagadda et al. |
| 2017/0187679 A1 | 6/2017 | Basak et al. |
| 2017/0250869 A1 | 8/2017 | Voellmy |
| 2017/0317928 A1 | 11/2017 | Gude et al. |
| 2017/0317976 A1 | 11/2017 | Chalvadi et al. |
| 2017/0317977 A1 | 11/2017 | Popuri et al. |
| 2017/0317979 A1 | 11/2017 | Bansal et al. |
| 2017/0318055 A1 | 11/2017 | Popuri et al. |
| 2018/0007000 A1 | 1/2018 | Bansal et al. |
| 2018/0007007 A1 | 1/2018 | Bansal et al. |
| 2018/0007008 A1 | 1/2018 | Bansal et al. |
| 2019/0207983 A1 | 7/2019 | Bansal et al. |
| 2019/0319925 A1 | 10/2019 | Chalvadi et al. |

FOREIGN PATENT DOCUMENTS

| | | | |
|---|---|---|---|
| JP | 2006040274 A | 2/2006 | |
| JP | 2009017269 A | 1/2009 | |
| JP | 2013012865 A | 1/2013 | |
| KR | 20080100620 A | 11/2008 | |
| WO | WO-02056562 A1 * | 7/2002 | ............ H04M 7/006 |
| WO | 2008095010 A1 | 8/2008 | |
| WO | 2013074828 A1 | 5/2013 | |

OTHER PUBLICATIONS

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, CISCO.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Guichard, J., et al., "Network Service Chaining Problem Statement," Network Working Group, Jun. 13, 2013, 14 pages, Cisco Systems, Inc.

Herndon, Joseph, "*FairWarning IP, LLC v. Iatric Systems, Inc.* (Fed. Cir. 2016)," Oct. 13, 2016, 3 pages.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Mayer, Alain, et al., "Offline Firewall Analysis," International Journal of information Security, Jun. 16, 2005, 20 pages. vol. 5, Issue 3, Springer-Verlag.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture Of A Identity Based Firewall System," Jul. 2011, 9 pages.

Thames, J. Lane, et al., "A Distributed Firewall and Active Response Architecture Providing Preemptive Protection," ACM-SE '08, Mar. 28-29, 2008, 6 pages, Auburn, AL, USA.

Haim, Roie Ben, "NSX Distributed Firewall Deep Dive", Apr. 30, 2015, 52 pages.

* cited by examiner

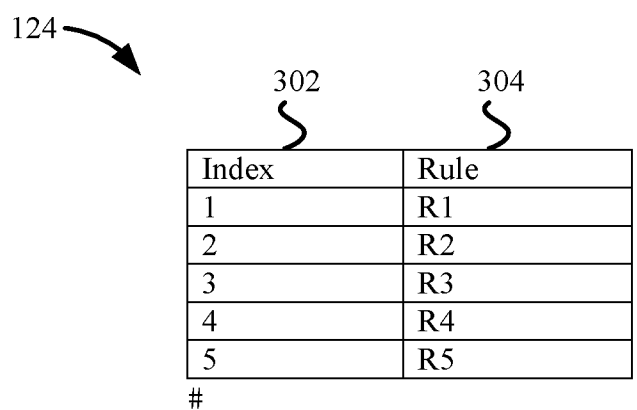
FIG. 3A
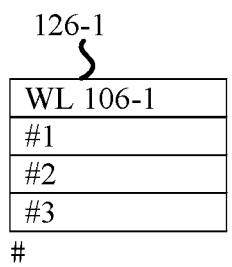 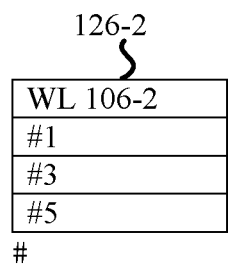 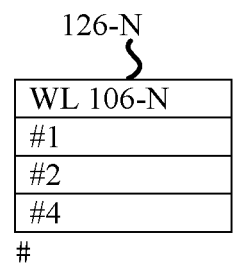
FIG. 3B  FIG. 3C  FIG. 3D

SHARING OF FIREWALL RULES AMONG MULTIPLE WORKLOADS IN A HYPERVISOR

BACKGROUND

Multiple workloads often run on a single hypervisor on a host computing machine. A distributed firewall may be distributed across the multiple workloads on the host and enforce rules close to the source of traffic for the workloads. Each individual workload may have its own copy of firewall rules that are stored in the hypervisor kernel to enforce different policies, such as a security policy. Often, multiple workloads on the same hypervisor have some common firewall rules in their own copy of the rules. This may be because the workloads are executing similar functionality on the same hypervisor. For example, a company may put workloads that are performing the same or similar functions on a single host. Even though there are common firewall rules, the distributed firewall stores a separate set of firewall rules for each workload. This consumes a large amount of memory in the hypervisor, which may limit the number of firewall rules that a hypervisor can support.

BRIEF DESCRIPTION OF THE DRAWINGS

FIG. 3A shows an example of a rules table according to some embodiments.

FIGS. 3B to 3D depict examples of index tables according to some embodiments.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

A hypervisor on a host computing device receives a copy of firewall rules for a group of workloads running on that hypervisor. The hypervisor may store a single copy of the firewall rules in the hypervisor for the group. Each workload may have an associated set of firewall rules where different workloads may apply a different set of firewall rules. Instead of storing a distinct copy of the firewall rules for each workload, the hypervisor stores a list of references to the firewall rules in an index table for each workload. The index table includes references to rules in a rules table. For example, a first index table for a first workload may include a first set of references that reference a first set of rules in the rules table and a second index table for a second workload may include a second set of references that reference a second set of rules in the rules table. The first set of references and the second set of references may include different references to rules, such as the first set of references may reference rules R1, R2, and R3, and the second set of references may reference rules R1, R3, and R5.

The use of the index tables allows the hypervisor to save memory. For example, storing only a single copy of the rules for the firewall rules used by the group of workloads eliminates the memory needed to store a distinct copy of firewall rules for each workload. Storing an index table for each workload may use a much smaller amount of memory than storing the distinct copy of rules for each workload. Using less memory provides some advantages, such as the use of less memory to store distinct copies of rules for each workload may allow the hypervisor to store a larger amount of rules in the rules table.

System Overview

Figure 1:
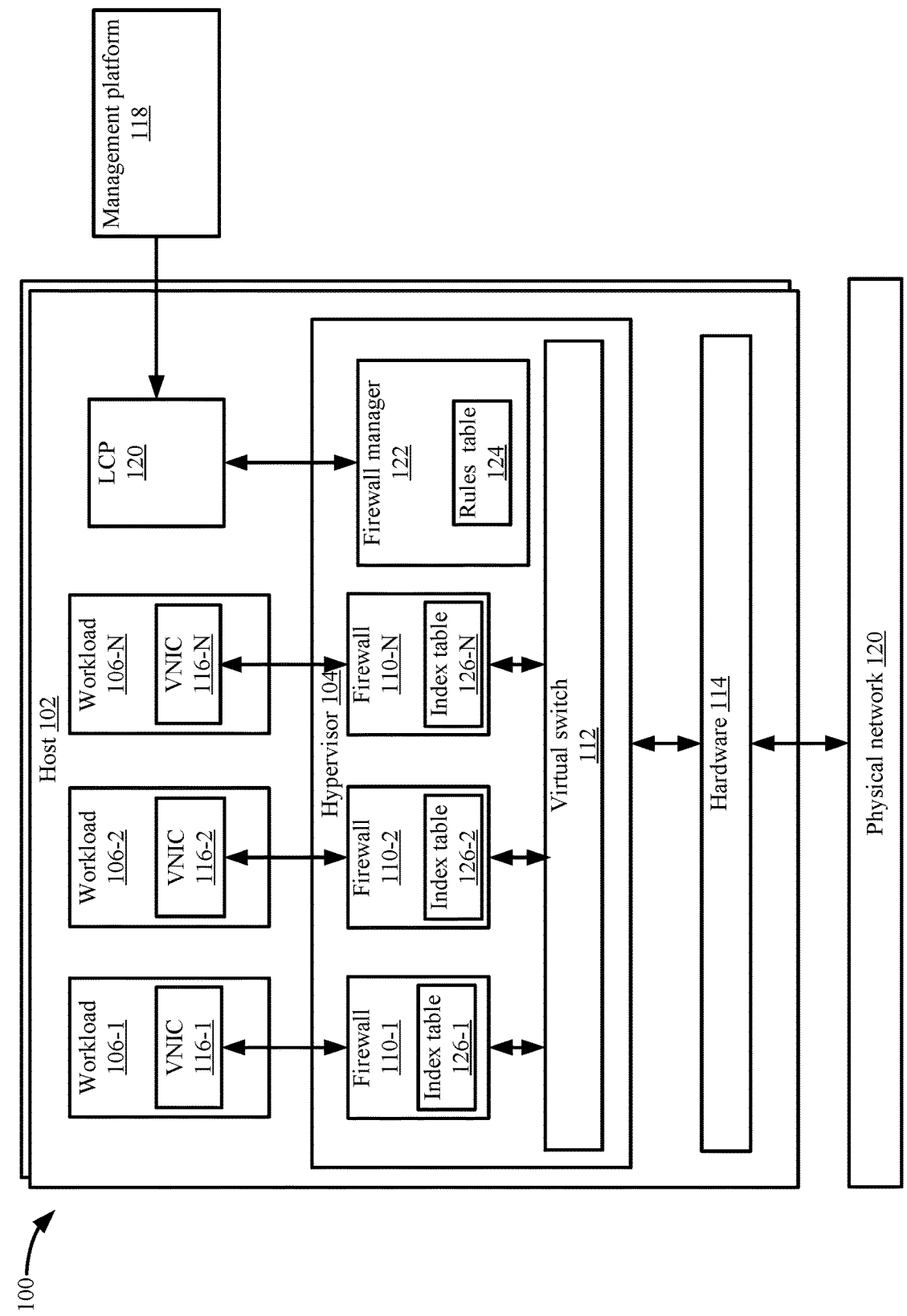
FIG. 1 depicts a simplified system for implementing a distributed firewall according to some embodiments.

FIG. 1 depicts a simplified system 100 for implementing a distributed firewall according to some embodiments. Hosts 102 may include workloads 106-1 to 106-N. Workloads may refer to virtual machines that are running on a respective host, but this is one example of a virtualized computing instance or compute node. Any suitable technology may be used to provide a workload. Workloads may include not only virtual machines, but also containers (e.g., running on top of a host operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers.

Workloads 106-1 to 106-N may send and receive packets through virtual network interface cards (VNIC) 116-1 to 116-N. The packets may be sent through a virtual switch 112 in hypervisor 104 to a physical network interface card (PNIC) in hardware 114. Then, packets are routed through physical network 120. Also, packets are received from physical network 120 at the PNIC, and sent through virtual switch 112 to VNICs 116 of workloads 106.

Management platform 118 may be a platform that manages the virtual networks on host computing machines 102. For example, management platform 118 may centrally manage firewall rules that are distributed to different hosts 102.

A local controller plane (LCP) 120 may be a process that is running on hypervisor 104. LCP 120 receives the firewall rules for workloads 106 from management platform 118. For example, LCP 120 interacts with management platform 118 to retrieve the firewall rules. In some embodiments, LCP 120 is running in the user space of hypervisor 104; however, the implementation of LCP 120 may be different. LCP 120 processes the firewall rules to build rules table 124 and index tables 126-1 to 126-N, the processing of which will be described in more detail below.

Firewall manager 122 manages the configuration of the distributed firewall in hypervisor 104. For example, firewall manager 122 stores a central copy of all firewall rules in the memory of hypervisor 104, such as in a rules table 124. The structure and use of rules table 124 will be described in more detail below. Although LCP 120 and firewall manager 122 are described as being separate components, other configurations may be used, such as functions of both may be combined or distributed to other entities.

Instances of firewalls 110-1 to 110-N are configured for each respective workload 106-1 to 106-N. For example, each instance of distributed firewall 110 may be enforced in between VNIC 116 and virtual switch 112. However, firewall 110 may be situated at any point in a path of packets, such as at VNIC 116, or anywhere in between workload 106 and virtual switch 112. Firewall 110 intercepts packets sent from VNIC 116 before they reach virtual switch 112 and also intercepts packets from virtual switch 112 before they reach VNIC 116. Each respective workload 106 may have an associated firewall situated between VNIC 116 and virtual switch 112 although firewalls 110 may be placed at other positions.

Firewalls 110-1 to 110-N store index tables 126-1 to 126-N, respectively. Each index table 126 references specific firewall rules that apply to the respective workload 106. Those references are used to retrieve rules in rules table 124 when enforcing policies at firewalls 110. The structure of index table 126 and enforcement of policies will be described in more detail below.

Rules Distribution

Management platform 118 may distribute a copy of firewall rules for a group of workloads 106 running on hypervisor 104 of a host 102. In some embodiments, the copy of firewall rules is for all workloads 106 running on hypervisor 104. However, management platform 118 may provide different groups of firewall rules for groups of workloads 106 that are running on hypervisor 104. For example, a first group of workloads 106 on host 102 may have an associated first copy of firewall rules and a second group of workloads 106 on host 102 may have a second copy of firewall rules.

Figure 2:
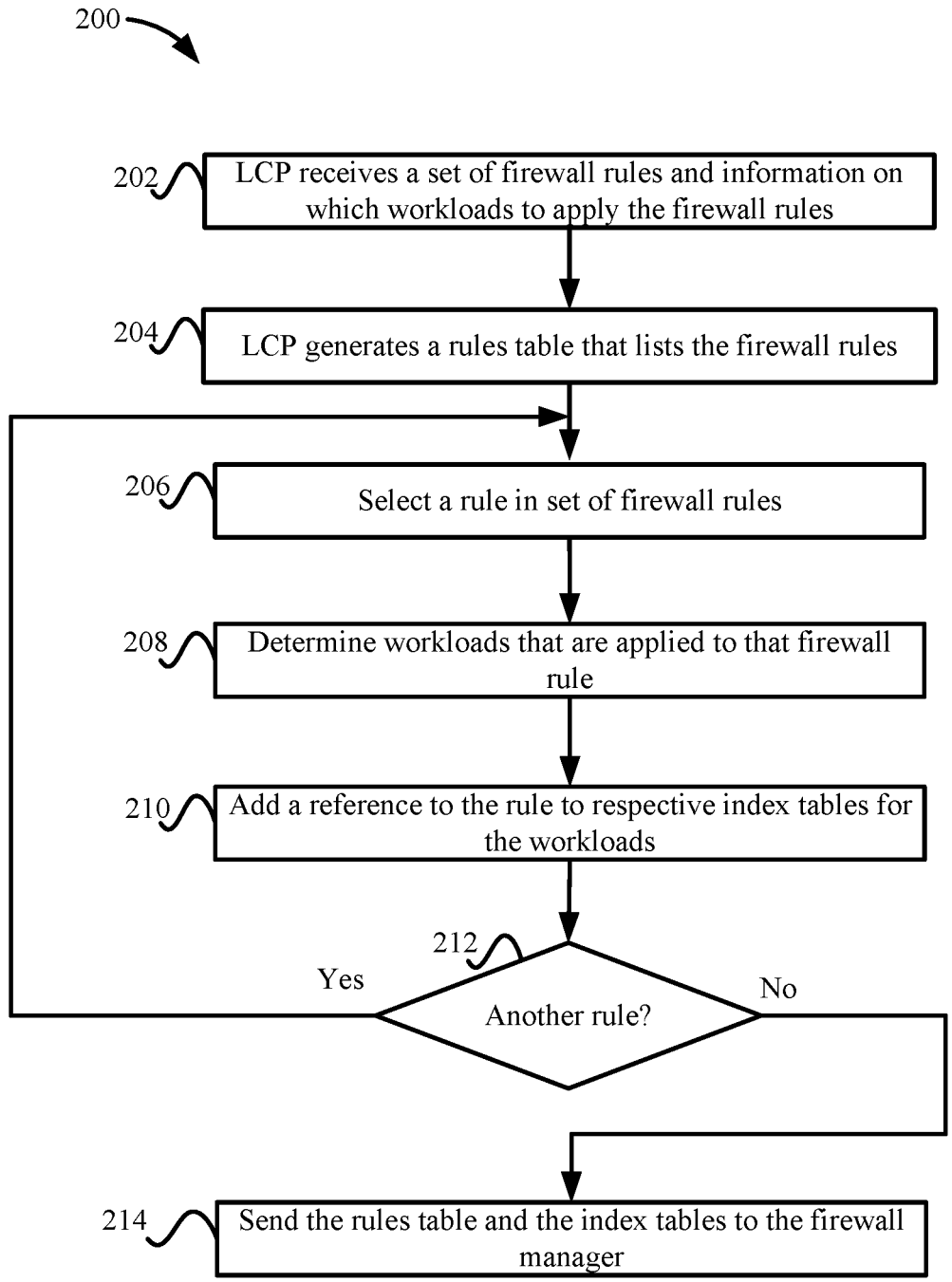
FIG. 2 depicts a simplified flowchart of a method for processing firewall rules according to some embodiments.

LCP 120 receives and processes the firewall rules for workloads 106 from management platform 118. LCP 120 reviews the rules and can generate index tables that reference each rule that is associated with a specific workload 106. FIG. 2 depicts a simplified flowchart 200 of a method for processing firewall rules according to some embodiments. At 202, LCP 120 receives rules and information on which workloads to apply to the rules. LCP 120 may receive only one copy of the all the rules. At 204, LCP 120 generates a rules table 124 that stores the rules. Rules table 124 may be a data structure, such as an index that refers to information for each of the firewall rules.

FIG. 3A shows an example of a rules table according to some embodiments. A first column 302 may be an index and a second column 304 may store the information for the rule. In this example, the indices include #1, #2, . . . , #5 and there are five rules R1, R2, . . . , R5. The information for the rules may be stored in each entry in rules table 124 for each rule. For example, information for rule R1 is stored for index #1; the information for rule R2 is stored for index #2, etc. Although only one column for the rules is shown at 304, the information for the rules may be stored in different formats. For example, each rule may list any combination of information that can be used to apply the rule to a packet, such as a 5-tuple of a source Internet protocol (IP) address, a destination IP address, protocol used, a layer 4 (L4) source port, and a layer 4 destination port. The 5-tuple may be stored in different columns, such as the source address is stored in a first column, the destination address is stored in a second column, etc. The information for the rules may also include an action to perform if the rule applies to a packet, such as "allow" or "block". The allow action allows the packet to be sent or received by workload 106 and the block action does not send the packet from workload 106 or send the packet to workload 106. Other actions may also be appreciated.

Referring back to FIG. 2, at 206, LCP 120 selects a rule in the set of firewall rules. For example, the first rule R1 may be selected. Then, at 208, LCP 120 determines workloads that are applied to that firewall rule. In some embodiments, each rule may include a statement, such as an "apply to" statement that lists the workloads 106 in which the rules should be applied. Each workload 106 may be identified by a VNIC identifier and LCP 120 determines the VNIC identifier for each workload 106 in which the rule applies. Although VNIC identifiers are discussed, other identifying information for a workload may be used. For example, the rules may be applied per datacenter, per a cluster of hosts, per a grouping of workloads, per a workload identifier, etc. Then, at 210, LCP 120 adds a reference to each respective index table for the workloads for the rule.

At 212, LCP 120 determines if another rule is found in the set of rules. If so, the process reiterates to 206 where another firewall rule is selected. The process continues to determine workloads associated with the new rule. LCP 120 then adds a reference to the rule to the respective index tables for the workloads. Once finished, each index table 126 may include a set of references that reference a set of rules in rules table 124. Accordingly, when there are no more rules to analyze, at 214, LCP 120 sends rules table 124 and index tables 126-1 to 126-N to firewall manager 122.

FIGS. 3B to 3D depict examples of index tables 126-1 to 126-N according to some embodiments. Rows of index tables 126-1 to 126-N may list references to the rules. For example, in FIG. 3B, for a workload 106-1, index table 126 stores references to rules R1, R2, and R3. Referring to rules table 124 in FIG. 3A, the indices for rules R1, R2, and R3 are #1, #2, and #3, respectively, and the indices may be used to retrieve the information for rules R1, R2, and R3 from rules table 124. In FIG. 3C, index table 126 lists references to rules R1, R3, and R5 for workload 106-2. The indices in index table 126 are #1, #3, and #5, and correspond to respective indices in rules table 124. Finally, in FIG. 3D, index table 126-N lists the rules for workload 106-N. These rules are R1, R2, and R4 and refer to the indices of #1, #2, and #4 in rules table 124. The references may be a pointer or other information that points to an entry in rules table 124. The reference for a rule includes less information than the information for the rule itself.

Distributed Firewall

Firewall manager 122 may be running in the kernel space of hypervisor 104. Once receiving rules table 124 from LCP 120, firewall manager 122 stores a copy of rules table 124 in the memory of hypervisor 104. In some embodiments, firewall manager 122 stores a single copy of rules table 124 in hypervisor 104 for the group of workloads 106.

Firewall manager 122 then stores a copy of each respective index table 126 in a respective firewall 110 for each respective workload 106. Each index table 126-1 to 126-N may identify a specific workload 106-1 to 106-N. For example, each index table 126 may reference a VNIC identifier for a respective workload 106. Firewall manager 122 uses the VNIC identifier for an index table 126 to store the index table for that firewall 110. Each firewall 110 then has an associated index table 126. For example, firewall 110-1 includes an index table 126-1, firewall 110-2 includes an index table 126-2, and so on. In some examples, logic for firewall 110 may be instantiated between VNIC 116 and a port of virtual switch 112. The rules are stored with the instantiation of firewall 110 between VNIC 116 and the port of virtual switch 112.

Figure 4:
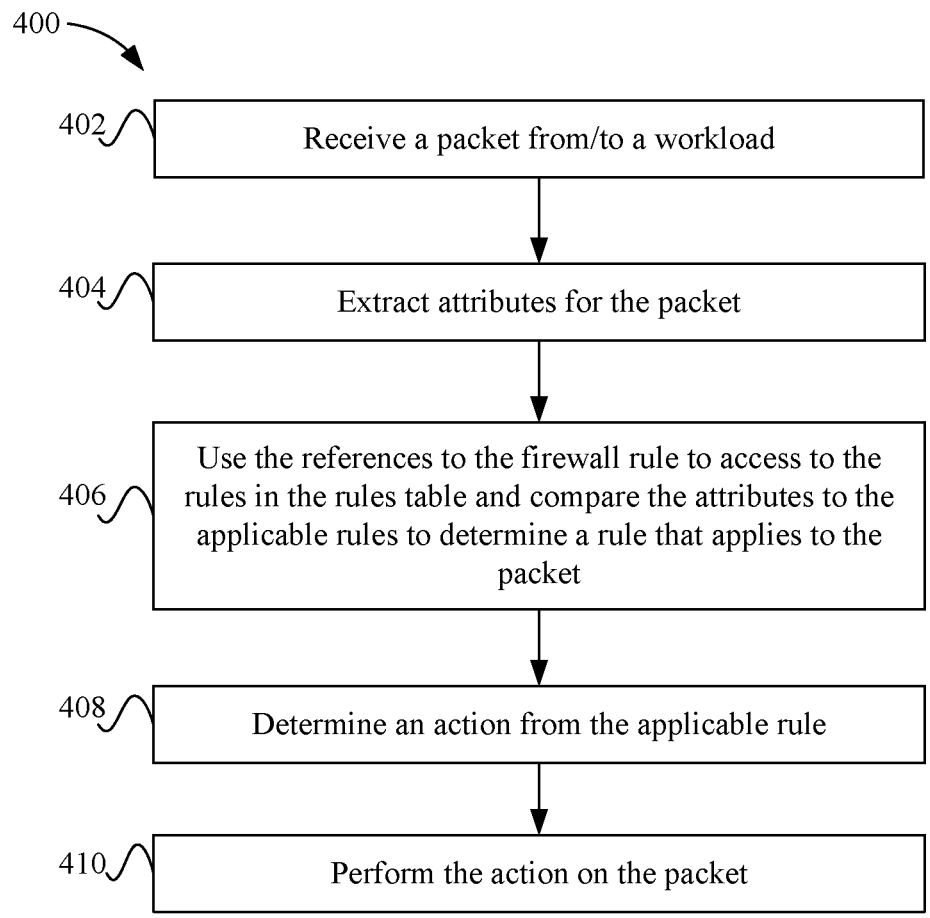
FIG. 4 depicts a simplified flowchart of a method for processing packets using a firewall according to some embodiments.

Once index tables 126 and rules table 124 have been stored, firewalls 110 may process packets for workloads 106. FIG. 4 depicts a simplified flowchart 400 of a method for processing packets using firewall 110 according to some embodiments. At 402, firewall 110 intercepts a packet that is being sent from workload 106 or is being sent to workload 106, such as the packet is intercepted between VNIC 116 and virtual switch 112. At 404, firewall 110 extracts one or more attributes for the packet. In some examples, the attributes may be associated with characteristics of workload 106, such as the 5-tuple described above; however, other combinations of attributes may be used. The attributes may be from different layers, such as attributes from layer 2 to layer 4.

At 406, firewall 110 uses the references for the rules in index table 126 to access to the rules from rules table 124 and compares the attributes to the applicable rules in index table 126 to determine a rule that applies to the packet. For example, for workload 106-1, firewall 110 retrieves references #1, #2, and #3 to rules R1, R2, and R3. Firewall 110 uses the references to access rules R1, R2, and R3 in rules table 124. For example, information for rules R1, R2, and R3 are accessed at indices #1, #2, and #3 in rules table 124.

Firewall 110 may access rules from rules table 124 in different ways. In some examples, firewall 110 communicates with firewall manager 122 by sending the reference to firewall manager 122, which retrieves the rule and sends information for the rule to firewall 110. In other examples, firewall 110 uses the reference to retrieve the applicable rule from rules table 124 without communicating with firewall manager 122.

Firewall 110 may use different methods to perform the comparison. In some examples, firewall 110 enforces the rules from a top to bottom ordering. For each packet, firewall 110 checks the top rule listed in index table 126 before moving down to the subsequent rules listed in index table 126. The first rule listed in index table 126 that matches the attributes is enforced using this policy. The last rule that is listed at the bottom of index table 126 may be a default rule that is enforced on the packet if no other rule has attributes that match the attributes of the packet. The default rule may not specify any particular attributes so that the default rule can match all packets. Although this top to bottom ordering policy is described, other methods may be used. For example, firewall 110 may determine all the rules that match the attributes and then select the one of the rules based on a ranking system.

Using the above process, firewall 110 may start with a first rule R1 listed in index table 126, access rule R1 in rules table 124 using the reference #1, and then compare the attributes of the packet to the attributes listed for rule R1. In some embodiments, firewall 110 may access a source and destination from columns in rules table 124, and compare the source and destination of the packet to the source and destination of the rule. If the attributes listed for rule R1 do not match the attributes of the packet, then firewall 110 proceeds to determine if attributes for rule R2 match the attributes of the packet. If the attributes for rule R2 do not match the attributes of the packet, then rule R3 is enforced as the default rule.

At 408, once firewall 110 determines the applicable rule for the packets, firewall 110 determines an action for the rule. For example, the rule may list an action to perform, such as an action of allow the packet or block the packet. Then, at 410, firewall 110 performs the action on the packet, which could route the packet to workload 106 or to virtual switch 112 if the packet is allowed, or just block the packet from being sent from or to workload 106.

To improve the speed of filtering packets, firewall 110 may use a connection table together with the firewall rules. A connection table may store network connections in a fast lookup data structure such like hash table. Each network connection may be a unique identifier, such as a 5-tuple, based on packet attributes. If the first packet of a connection is allowed by the firewall rules, firewall 110 inserts an instance of the connection into the connection table. The following packets in the same connection may be allowed as well. Firewall 110 may look up packets in the connection table before attempting to match the firewall rules. When a packet does not match any existing connections in the connection table, firewall 110 then compares the packet to the firewall rules in index table 126.

Accordingly, hypervisor 104 uses less memory to store the rules. For example, hypervisor 104 may only store one copy of firewall rules R1 to R5, which uses memory to store five rules. However, workloads 106-1 to 106-N may each have three applicable rules that are used totaling nine rules. If an individual copy of each rule is stored for workloads 106-1 to 106-N, memory is used to store nine rules, which uses more memory than storing five rules. Thus, some embodiments eliminate the storage requirement for four rules in this example. For example, rule R1 does not need to be stored three times for workload 106-1, 106-2, and 106-N. Similarly, multiple copies of rule R2 do not need to be stored for workload 106-1, 106-N, and multiple copies of rule R3 do not need to be stored for workloads 106-1 and 106-2. The storage of individual copies of rules for each workload 106 is replaced by index tables and the storage of index tables 126 use significantly less space than the storage for individual sets of the rules for each workload 106 because storing the indices to rules uses less storage than the content of the rules themselves.

At some points, management platform 118 may update the firewall rules. LCP 120 receives a new copy of all the firewall rules for a group of workloads 106 that are running on hypervisor 104. Then, LCP 120 recomputes index tables 126-1 to 126-N for each workload 106-1 to 106-N. Additionally, LCP 120 computes a new rules table 124. LCP 120 then sends the new index tables 126 and new rules table 124 to firewall manager 122. While LCP 120 generated the new index tables 126 and new rules table 124, firewall manager 122 still uses existing index tables 126-1 to 126-N and the existing rules table 124. LCP 120 creates a new set of index tables 126 and rule table 124 to allow the distributed firewall to operate while the update is taking place. When the new index tables 126 and new rule table 124 are ready, firewall manager 122 can switch from using the previous index tables to new index tables and from the previous rules table to the new rules table.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
receiving, by a computing device, a packet at an instance of a distributed firewall that is associated with a workload in a plurality of workloads running on a hypervisor, wherein each of the plurality of workloads has an associated instance of the distributed firewall;
accessing, by the computing device, an index table for the workload, wherein the index table includes a set of references to a set of rules in a rules table, wherein the set of rules stores a single instance of at least one rule and each workload in the plurality of workloads is associated with an index table that references rules that are applicable to each respective workload;
accessing, by the computing device, the at least one rule in the set of rules associated with the set of references from the rules table; and
comparing, by the computing device, one or more attributes for the packet to information stored for the at least one rule in the set of rules to determine a rule in the set of rules to apply to the packet, wherein:
a first index for a first workload in the plurality of workloads references a first set of rules, and
a second index for a second workload in the plurality of workloads references a second set of rules, wherein at least one rule in the first set of rules and the second set of rules is the same.

2. The method of claim 1, wherein accessing the index table, accessing the rules table, and applying the attributes for the packet comprises:
accessing a first reference in the set of references;
selecting a first rule referenced by the first reference from the rules table; and
applying the one or more attributes of the packet to information for the first rule.

3. The method of claim 2, further comprising:
when the one or more attributes of the packet apply to the first rule, applying an action for the first rule to the packet; and
when the one or more attributes of the packet do not apply to the first rule, continuing to use references to access other rules and applying the one or more attributes of the packet to information for the other rules until one or more attributes of the packet apply to one of the other rules.

4. The method of claim 1, wherein:
each instance of the distributed firewall stores a respective index table, and
a single instance of the set of rules is stored for the distributed firewall.

5. The method of claim 1, further comprising:
receiving the set of rules;
analyzing a statement for each rule that identifies workloads, the identified workloads being workloads in which the rule applies; and
building each index table for the plurality of workloads based on the analyzing of the statement for each rule.

6. The method of claim 1, wherein instances for the distributed firewall are placed in between a virtual network interface card for each of the plurality of workloads and a virtual switch.

7. A non-transitory computer-readable storage medium containing instructions, that when executed, control a computer system to be operable for:
receiving a packet at an instance of a distributed firewall associated with one of a plurality of workloads running on a hypervisor, wherein each of the plurality of workloads has an associated instance of the distributed firewall;
accessing an index table for the workload, wherein the index table includes a set of references to a set of rules in a rules table, wherein the set of rules stores a single instance of at least one rule and each workload in the plurality of workloads is associated with an index table that references rules that are applicable to each respective workload;

accessing the at least one rule in the set of rules associated with the set of references from the rules table; and comparing one or more attributes for the packet to information stored for the at least one rule in the set of rules to determine a rule in the set of rules to apply to the packet, wherein:

a first index for a first workload in the plurality of workloads references a first set of rules, and a second index for a second workload in the plurality of workloads references a second set of rules, wherein at least one rule in the first set of rules and the second set of rules is the same.

8. The non-transitory computer-readable storage medium of claim 7, wherein accessing the index table, accessing the rules table, and applying the attributes for the packet comprises:

accessing a first reference in the set of references;

selecting a first rule referenced by the first reference from the rules table; and applying the one or more attributes of the packet to information for the first rule.

9. The non-transitory computer-readable storage medium of claim 8, further operable for:

when the one or more attributes of the packet apply to the first rule, applying an action for the first rule to the packet; and when the one or more attributes of the packet do not apply to the first rule, continuing to use references to access other rules and applying the one or more attributes of the packet to information for the other rules until one or more attributes of the packet apply to one of the other rules.

10. The non-transitory computer-readable storage medium of claim 7, wherein:

each instance of the distributed firewall stores a respective index table, and a single instance of the set of rules is stored for the distributed firewall.

11. The non-transitory computer-readable storage medium of claim 7, further operable for:

receiving the set of rules;

analyzing a statement for each rule that identifies workloads, the identified workloads being workloads in which the rule applies; and building each index table for the plurality of workloads based on the analyzing of the statement for each rule.

12. The non-transitory computer-readable storage medium of claim 7, wherein instances for the distributed firewall are placed in between a virtual network interface card for each of the plurality of workloads and a virtual switch.

13. An apparatus comprising:

one or more computer processors; and a non-transitory computer-readable storage medium comprising instructions, that when executed, control the one or more computer processors to be operable for:

receiving a packet at an instance of a distributed firewall associated with one of a plurality of workloads running on a hypervisor, wherein each of the plurality of workloads has an associated instance of the distributed firewall;

accessing an index table for the workload, wherein the index table includes a set of references to a set of rules in a rules table, wherein the set of rules stores a single instance of at least one rule and each workload in the plurality of workloads is associated with an index table that references rules that are applicable to each respective workload;

accessing the at least one rule in the set of rules associated with the set of references from the rules table; and comparing one or more attributes for the packet to information stored for the at least one rule in the set of rules to determine a rule in the set of rules to apply to the packet, wherein:

a first index for a first workload in the plurality of workloads references a first set of rules, and a second index for a second workload in the plurality of workloads references a second set of rules, wherein at least one rule in the first set of rules and the second set of rules is the same.

14. The apparatus of claim 13, wherein accessing the index table, accessing the rules table, and applying the attributes for the packet comprises:

accessing a first reference in the set of references;

selecting a first rule referenced by the first reference from the rules table; and applying the one or more attributes of the packet to information for the first rule.

15. The apparatus of claim 14, further operable for:

when the one or more attributes of the packet apply to the first rule, applying an action for the first rule to the packet; and when the one or more attributes of the packet do not apply to the first rule, continuing to use references to access other rules and applying the one or more attributes of the packet to information for the other rules until one or more attributes of the packet apply to one of the other rules.

16. The apparatus of claim 13, wherein:

each instance of the distributed firewall stores a respective index table, and a single instance of the set of rules is stored for the distributed firewall.

17. The apparatus of claim 13, further operable for:

receiving the set of rules;

analyzing a statement for each rule that identifies workloads, the identified workloads being workloads in which the rule applies; and building each index table for the plurality of workloads based on the analyzing of the statement for each rule.

18. The apparatus of claim 13, wherein instances for the distributed firewall are placed in between a virtual network interface card for each of the plurality of workloads and a virtual switch.

* * * * *